July 24, 1951   J. L. BRIGHT   2,561,558
LOCKING DEVICE FOR CONTROL SURFACES ON AIRPLANES
Filed May 8, 1945   2 Sheets-Sheet 1

Inventor
Joseph L. Bright
By Fred Gerlach
his Atty

July 24, 1951 J. L. BRIGHT 2,561,558
LOCKING DEVICE FOR CONTROL SURFACES ON AIRPLANES
Filed May 8, 1945 2 Sheets-Sheet 2
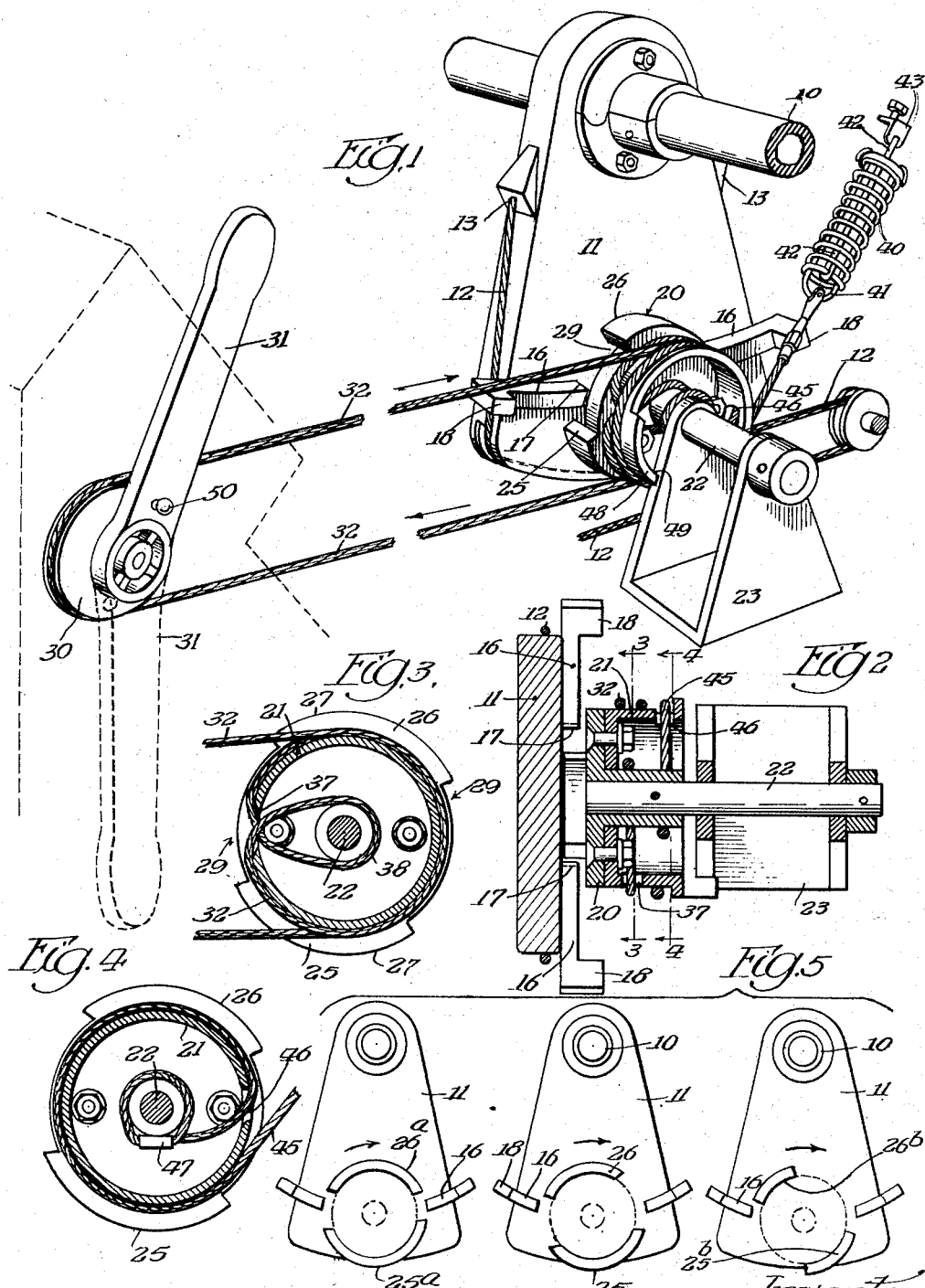
Inventor
Joseph L. Bright
By Fred Gerlach Atty.

Patented July 24, 1951

2,561,558

UNITED STATES PATENT OFFICE 2,561,558

LOCKING DEVICE FOR CONTROL SURFACES ON AIRPLANES

Joseph L. Bright, La Mesa, Calif., assignor to Consolidated Vultee Aircraft Corporation, San Diego, Calif., a corporation of Delaware Application May 8, 1945, Serial No. 592,694

4 Claims. (Cl. 244—83)

The invention relates to devices for locking control surfaces on airplanes.

When airplanes are grounded, it is frequently necessary or desirable to lock the control surfaces, such as the rudder, elevator, ailerons or landing flaps. These control surfaces are usually operable by controls in the pilot's compartment and cable between the controls and the control surfaces.

Heretofore it has been the practice to lock the control surfaces or parts of the operating connections by straps, blocks or devices which are not positively acting and do not relieve the control cables of stresses and strains, particularly during storms, so that the control cables are subjected to shock loads and fatigue stresses which cause them to stretch or become slack. A desideratum in locking these control surfaces is to prevent stresses or strains on the cable-connections between the surfaces and the controls.

Another disadvantage in the use of blocks or straps was that the control surfaces could not be locked or unlocked from the inside of the airplane and there have been instances in which crashes resulted from this cause.

One object of the invention is to provide a safe, positive acting locking device for an airplane control surface, operable by a remote control lever in the pilot's compartment while the airplane is grounded so that the pilot may selectively control the locking devices while in the airplane.

Another object of the invention is to provide a locking device for an airplane control surface which is adapted for remote control by the pilot in the airplane and which, when the control surface is locked, will relieve the cable-connections for shifting the control surface of any stresses or strains.

Another object of the invention is to provide remotely controlled individual acting locking devices for several of the control surfaces whereby the control surfaces may be severally and collectively locked.

Other objects of the invention will appear from the detailed description.

The invention consists in the several features hereinafter set forth and more particularly defined by claims at the conclusion hereof.

In the drawings:

Fig. 1 is a perspective of a locking device for the elevator and the lock-control lever, the cable connection being broken away.

Fig. 2 is a section through the locking device associated with the quadrant or arm on the torque tube or shaft which is operatively connected to the elevator.

Fig. 3 is a section taken on line 3—3 of Fig. 2.

Fig. 4 is a section taken on line 4—4 of Fig. 2.

Fig. 5 is a diagrammatic view of the locking devices for a series of control surfaces, such as the elevator, rudder and landing flaps.

Figure 6:
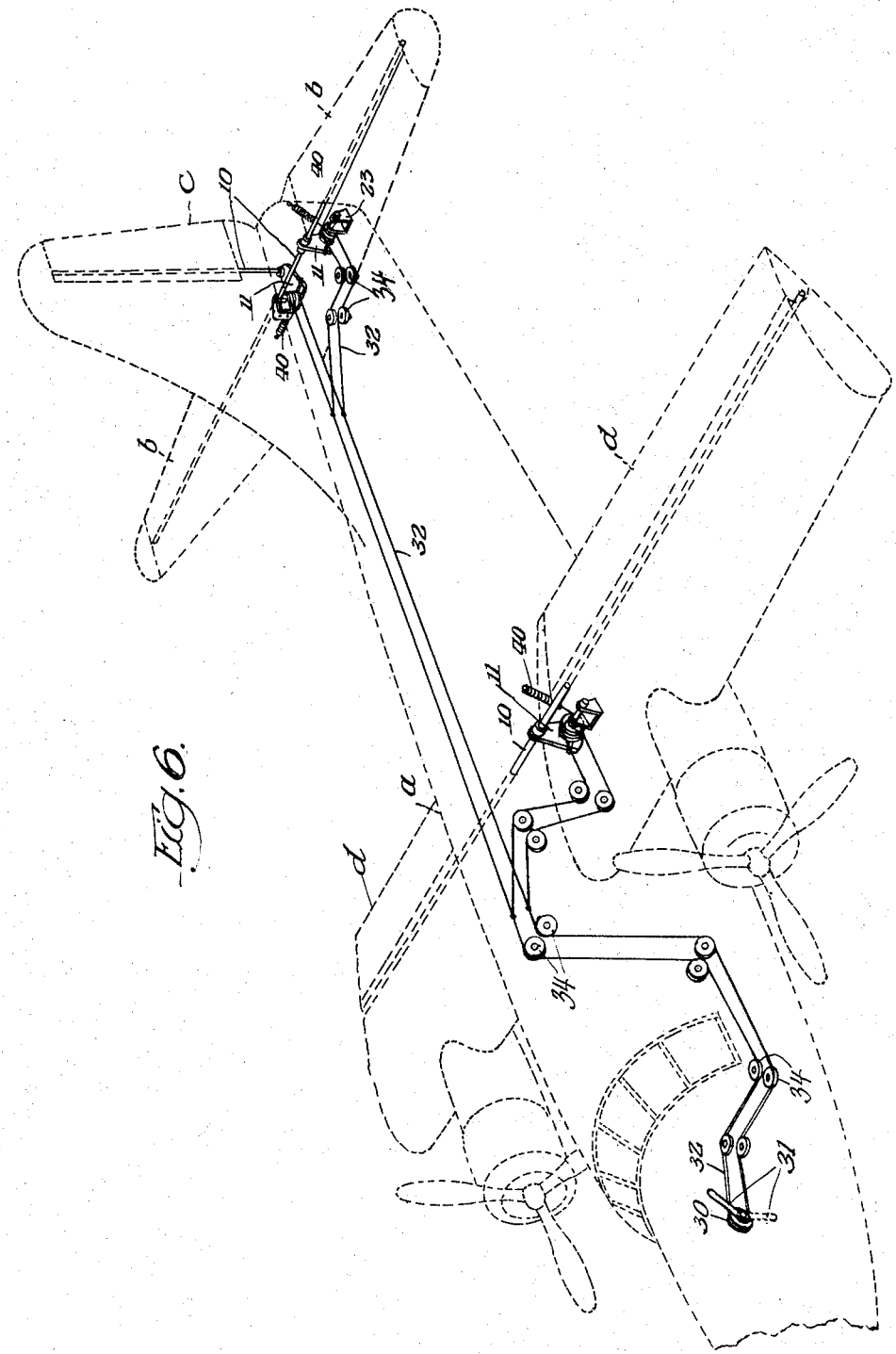
Fig. 6 is a phantom and diagrammatic view of an airplane equipped with a series of locking devices for control surfaces.

The invention is exemplified in an airplane $a$ which is equipped with elevator-members $b$, a rudder $c$, and landing flaps $d$, which may be of any usual suitable construction, as well understood in the art.

Each control surface is pivotally supported and shiftable by a torque tube or shaft 10, which is pivotally supported in the structure of the airplane. An arm or sector 11 is fixedly secured to the torque tube or shaft 10 for each control surface and is operable by a cable 12. Each cable 12 has its ends fixedly secured, as at 13, to an arm 11 and is extended to a remote control device (not shown) so that a pull upon one reach of the cable 12 will shift arm 11 and its associated control surface in one direction, and a pull upon the other reach of the cable 12 will shift arm 11 in its opposite direction. Each cable 12 is connected to a suitable control device (not shown) in the pilot's compartment, as well understood in the art. Each arm 11 functions as an element for shifting a control surface from suitable controls and cable-connections of usual contruction, which are operable independently of the locking devices, and, therefore, it has not been deemed necessary to illustrate the operating connections for the control surfaces.

One face of each arm 11 has affixed thereto or integrally formed therewith, a pair of arcuate members 16. The inner ends 17 of members 16 are spaced apart, or separated by a gap, and function as abutments for rotatable locking members which are rotatable between said abutments and adapted to lock arm 11 against rotation in either direction. The spaces or gaps between said abutments permit the locking elements to be rotated into and out of the arcuate path of movement of members 16, for controlling the operation of arm 11 in either direction from its neutral or normal position. The outer ends of arcuate members 16 are provided with projecting stops 18 for limiting the movement of arm 11 from its neutral position and in opposite directions, respectively.

A device is provided for locking the abutments on each arm 11, and these devices are alike in construction. Each locking device comprises a drum 21 and a member 20 which are secured together for conjoint rotation and mounted on a shaft 22 which is journalled in a bracket 23 which is secured to the airplane structure. Shaft 22 is mounted so that when arm 11 is in its neutral position, the prolongation of the axis of said shaft extends centrally of the space or gap between the abutments 17 on the inner ends of the members 16. Each rotatable member 20 is provided with a pair of diametrically opposite longitudinally projecting locking members 25 and 26, each of which has an arcuate and concentric periphery 27 with arcuate spaces or gaps 29 between the inner ends of said members. Member 20 is rotatable from its neutral position and the peripheries 27 of locking members 25 and 26 will pass into the gaps between the abutments 17 on the inner ends of said members, and lock arm 11 against rotation in either direction. When the drum 21 and member 20 are in normal position, arcuate abutment members 16 are free to move through the spaces 29 between locking members 25 and 26 to permit the rotation of arm 11 in either direction by cable 12. Projecting stops 18 are adapted to engage the peripheral portions of the members 20 at the notches or cut-away spaces 29, to limit the throw of arm 11.

The drum 21 and locking member 20 are rotatable for locking and unlocking arm 11 by a cable-connection which is operatively connected to a sheave 30 which is secured to a lever 31 which is mounted in the pilot's compartment, usually on the engine control pedestal. A cable 32 which is operable by sheave 30 on lever 31 is suitably guided by sheaves 34 mounted in the airplane structure, and secured to drum 21 so that a swinging movement of lever 31 will impart rotation to said drum. Cable 32 is looped around a peripheral portion of drum 21, extends through a slot 37 in the periphery of drum 21, looped around the hub of drum 21 as at 38, then extended through the slot 37, and again looped around drum 21, and extends back to sheave 30.

In order to guard against accidental locking of arm 11 and the control surface shifted thereby, in the event that the cable-connection between drum 21 and lever 31 is ruptured in combat or otherwise, a device is provided for maintaining the drum 21 and rotatable member 20 in their neutral or non-locking position. The device for this purpose comprises a compression spring 40, one end of which is engaged by a shackle 41 and the other end of which is engaged by a hook on a stem 42 which is connected to a lug 43 secured to the airplane structure. Shackle 41 is connected by a cable 45 to drum 21. Cable 45 is looped around a peripheral portion of drum 21 and extends through a slot 46 in the drum and looped around the hub of the drum and secured thereon, as at 47. A stop-member 48 projects longitudinally from one end of the drum 21 and is adapted to engage a portion of the bracket 23. The end 49 of stop-member 48, when the drum 21 is in its neutral or non-locking position, will engage the bracket 23 and the force of spring 40 will be applied through cable 45 to drum 21 and hold the end 49 against bracket 23 so that drum 21 and locking members 25, 26 will be held in their neutral position where they will not interfere with the swing movements of arm 11 and abutment members 16. This exemplifies spring 40 and stop-means for preventing the locking device from being shifted into its locking position for arm 11, in the event cable 32 is ruptured or becomes inoperative.

A separate locking device is provided for each of the control surfaces and these devices are alike in construction. Each is arranged so that locking-members 25, 26 will co-act with the abutment members 16 on one of the arm 11. The locking device shown in Figs. 1 to 4 is provided with locking-members for the elevator, and the locking devices for the rudder and landing flaps are similar in construction, except for variation in the arcuate lengths of the locking-members 25, 26, as exemplified in Fig. 5.

In practice, it is desirable to control the locking devices for a series of control surfaces, such as the rudder, elevator and landing flaps from a single lever 31 in the pilot's compartment. For that purpose, cable 32 has branches connected to all of the locking devices, respectively.

The locking-members $25^a$ and $26^a$ for arm 11 which operates the rudder $c$ are formed of such arcuate lengths that they will lock said arm during an initial upward cycle of lever 31. The locking-members 25, 26 for the arm 11 which operates the elevator $b$ are of such arcuate length that they will lock said arm during a following cycle of the movement of lever 31 while the rudder $c$ remains locked. The locking-members $25^b$, $26^b$ of the arm 11 which shifts the landing flaps $d$ are of such length that they will lock said arm during a third cycle of movement of lever 31 while the movement of rudder and elevator remain locked. The locking-members on these devices are relatively positioned on drums 21 for this successive locking of the control surfaces. In this manner, a single lever 31 is adapted to control the locking devices for the rudder alone, the rudder and elevator, or the rudder, elevator and landing flaps.

In operation, the locking lever 31 will be in its normal position and the drums 21 in their neutral position while the airplane is in use. When the airplane is grounded and it is desired to lock the control surfaces, the pilot will shift lever 31 and operate cable 32 and its branches to rotate one or more of the drums 21. The locking members which rotate with the drums 21 will be rotated into the gaps between abutment members 16 on arms 11 so that said arms will be locked against rotation in either direction. A full stroke of lever 31 will successively lock the arms 11 as before described. Reverse movement of the lever will operate cable 32 and its branches to retractively rotate the drums 21 into their neutral positions so that arms 11 will be released for operation of the control surfaces. This locking is effected independently of the cable connections 12 which operate arms 11 for shifting the control surfaces. As a result, the control surfaces will be secured so that strains and stresses applied to them by a storm or other causes will not be transmitted to the cable-connections 12. This avoids stresses which are likely to rupture or stretch and loosen the cables which operate the control surfaces. The locking devices are controlled by a single remote control lever in the pilot's compartment. If cable 32 or any of its branches are ruptured in combat or by some other cause, a spring 40 will act through cable 45 to hold a stop-member 48 in engagement with its associated bracket 23 and the drums 21 and locking-members thereon will be retained in their neutral position so that there will be no interference with the operation of the control surfaces. If desired, a latch-pin 50 in sheave 30 may be used to lock lever 31 and said sheave, or index them in positions for rendering operative the several locking devices.

The invention is not to be understood as limited to the details described, since these may be modified within the scope of the appended claims without departing from the spirit and scope of the invention.

Having thus described the invention, what I claim as new and desire to secure by Letters Patent is:

1. In an aircraft having a control surface supported for pivotal movement by a shaft having an arm fixed thereto for effecting movement of the shaft, and a remotely controlled cable connected to said arm for selectively shifting said arm to effect shift of said shaft and control surface, means for releasably locking said arm comprising: circumferentially spaced apart abutments fixed on one face of said arm, arcuate abutments supported for rotative movement independently of and at the same side of said arm and rotatable between the abutments on the arm for locking the arm and spaced apart circumferentially to permit swinging movement thereof, a remote control lever on the airplane, and a connection operable by said lever for moving the arcuate abutments, independently of the arm-shifting connection, to selectively lock or release the arm.

2. In an aircraft having a control surface supported for pivotal movement by a shaft, a depending arm fixed to the shaft for effecting movement thereof, and a remotely controlled cable connected to said arm for selectively shifting said arm to effect shift of said shaft and control surface, means for releasably locking said arm comprising: circumferentially spaced apart abutments fixed on one face of said arm, a support member rotatively mounted independently of and at the same side of said arm, arcuate abutments on the support member for locking the arm and spaced apart circumferentially to permit swinging movement thereof, spaced apart stops carried by said arm and engageable with said support member to limit the swinging movement of said arm from its neutral position and in opposite directions, a drum rotatable with the support member, a remote control lever on the airplane, and a cable connection to said drum operable by said lever for moving the arcuate abutments, independently of the arm-shifting connection, to selectively lock or release the arm.

3. In an aircraft having a control surface supported for pivotal movement by a shaft, a depending arm fixed to the shaft for effecting movement thereof, and a remotely controlled cable connected to said arm for selectively shifting said arm to shift said control surface, means for releasably locking said arm comprising: circumferentially spaced apart abutments fixed on one face of said arm, arcuate abutments supported for rotative movement independently of and at the same side of said arm and rotatable between the abutments on the arm for locking the arm and spaced apart circumferentially to permit swinging movement thereof, spaced apart stops carried by said arm adapted to limit the swinging movement of said arm from its neutral position and in opposite directions, a drum rotatable with the arcuate abutments, a remote control lever on the airplane, a cable connection to said drum selectively operable by said lever for moving the arcuate abutments, independently of the arm-shifting connection, to selectively lock or release the arm, a spring operatively connected to said drum and exerting its bias to urge the drum and arcuate abutments into releasing position, and an abutment on said drum for arresting the movement of the drum and arcuate abutments by the spring, when the connection for selectively operating the arcuate abutments becomes inoperative.

4. In an aircraft having a plurality of control surfaces each supported for pivotal movement by a shaft, each of said shafts having a depending arm fixed thereto for effecting movement of the shaft, and remotely controlled cables connected to said arms for selectively shifting said arms to shift said control surfaces, means associated with each arm for releasably locking it, each means comprising: a set of circumferentially spaced apart abutments fixed on one face of each arm, arcuate abutments supported for rotative movement independently of and at the same side of each arm and rotatable between the abutments on the arm for locking the arm and spaced apart circumferentially to permit swinging movement thereof, a single remote control lever, and cable connections operable by said lever for moving the plurality of sets of arcuate abutments, to selectively and successively lock or release the arms.

JOSEPH L. BRIGHT.

REFERENCES CITED

The following references are of record in the file of this patent:

UNITED STATES PATENTS

| Number | Name | Date |
| --- | --- | --- |
| 751,547 | Nicholls | Feb. 9, 1904 |
| 2,191,543 | Osborne | Feb. 27, 1940 |
| 2,203,396 | Sterhardt | June 4, 1940 |
| 2,246,203 | De Florez | June 17, 1941 |
| 2,284,683 | Preussler | June 2, 1942 |
| 2,371,673 | Bondar | Mar. 20, 1945 |
| 2,409,762 | Jones | Oct. 22, 1946 |

FOREIGN PATENTS

| Number | Country | Date |
| --- | --- | --- |
| 110,883 | Great Britain | Nov. 8, 1917 |
| 461,734 | Germany | June 28, 1928 |